(12) United States Patent
Kluge

(10) Patent No.: US 10,036,411 B2
(45) Date of Patent: Jul. 31, 2018

(54) PLASTIC COMPONENT AND METHOD FOR PRODUCING A PLASTIC COMPONENT

(71) Applicant: ILLINOIS TOOL WORKS INC., Glenview, IL (US)

(72) Inventor: Martin Kluge, Roettingen (DE)

(73) Assignee: ILLINOIS TOOL WORKS INC., Glenview, IL (US)

( * ) Notice: Subject to any disclaimer, the term of this patent is extended or adjusted under 35 U.S.C. 154(b) by 736 days.

(21) Appl. No.: 14/386,065

(22) PCT Filed: Mar. 20, 2013

(86) PCT No.: PCT/US2013/033075
§ 371 (c)(1),
(2) Date: Sep. 18, 2014

(87) PCT Pub. No.: WO2013/142559
PCT Pub. Date: Sep. 26, 2013

(65) Prior Publication Data
US 2015/0117939 A1 Apr. 30, 2015

(30) Foreign Application Priority Data
Mar. 23, 2012 (DE) .......................... 10 2012 005 739

(51) Int. Cl.
*F16B 33/00* (2006.01)
*B29C 70/72* (2006.01)
(Continued)

(52) U.S. Cl.
CPC ............ *F16B 33/004* (2013.01); *B29C 45/14* (2013.01); *B29C 70/72* (2013.01); *F16B 33/006* (2013.01);
(Continued)

(58) Field of Classification Search
CPC ... B29C 45/14; B29C 45/14631; B29C 70/72; B29C 2045/14934; F16B 23/00;
(Continued)

(56) References Cited

U.S. PATENT DOCUMENTS 4,433,930 A * 2/1984 Cosenza ................ F16B 11/006
156/91
4,492,607 A * 1/1985 Halcomb .............. B29C 70/083
156/242

(Continued)

FOREIGN PATENT DOCUMENTS

| EP | 1197316 A1 | 4/2002 |
| EP | 1380404 A2 | 1/2004 |
| GB | 1360016 A | 7/1974 |

OTHER PUBLICATIONS

"Nylon Fasteners." The Nutty Company, Inc. Jan. 2, 2012, [online], [retrieved on Nov. 4, 2017]. Retrieved from the Internet <URL: https://web.archive.org/web/20120201143316/http://www.nutty.com/Nylon-Fasteners_c_15.html>.*

(Continued)

*Primary Examiner* — Josh Skroupa
(74) *Attorney, Agent, or Firm* — Hauptman Ham, LLP

(57) ABSTRACT

A plastic component with at least one fastening element attached to the plastic component, wherein the fastening element comprises at least one attachment section for attachment to the plastic component and at least one fastening section for fastening a part to be mounted on the plastic component, wherein the plastic component is composed of a plastic matrix, wherein the attachment section of the fastening element is integrated in a first area of the plastic matrix, and wherein reinforcement fibers are integrated in a second, different area of the plastic matrix, wherein the attachment section of the fastening element comprises at least one form element projecting from a surface of the (Continued)

Figure 5:
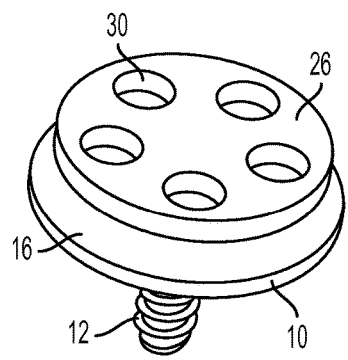

attachment section, wherein the at least one form element is integrated in the first area of the plastic matrix.

8 Claims, 5 Drawing Sheets

(51) Int. Cl.
*B29C 45/14* (2006.01)
*F16B 35/00* (2006.01)
*B29K 105/08* (2006.01)
*B29L 31/00* (2006.01)

(52) U.S. Cl.
CPC .......... *F16B 35/00* (2013.01); *B29K 2105/08* (2013.01); *B29L 2031/727* (2013.01); *Y10T 403/473* (2015.01); *Y10T 403/56* (2015.01)

(58) Field of Classification Search
CPC ...... F16B 33/004; F16B 33/006; F16B 35/00; Y10T 403/299; Y10T 403/47; Y10T 403/473; Y10T 403/477
USPC .......... 403/265, 268, 270, 299; 411/82, 82.5
See application file for complete search history.

(56) References Cited

U.S. PATENT DOCUMENTS

| | | | | |
|---|---|---|---|---|
| 4,566,924 A | * | 1/1986 | Hara | B29C 65/0672 156/580 |
| 4,792,475 A | | 12/1988 | Bien | |
| 5,756,185 A | * | 5/1998 | Lesser | B29C 45/0053 24/289 |
| 6,124,016 A | * | 9/2000 | Weil | B29C 37/0085 156/297 |
| D437,052 S | * | 1/2001 | Newsom | D24/129 |
| 7,645,105 B2 | * | 1/2010 | Hengel | B23K 11/0053 219/93 |
| 2011/0162779 A1 | * | 7/2011 | Stanley | F24F 3/0442 156/66 |

OTHER PUBLICATIONS

ISR and WO dated Oct. 21, 2013 in International Application No. PCT/US2013/033075.

* cited by examiner

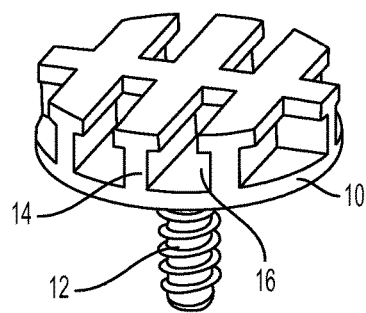
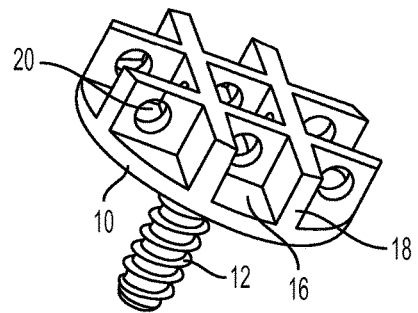
FIG. 1              FIG. 2
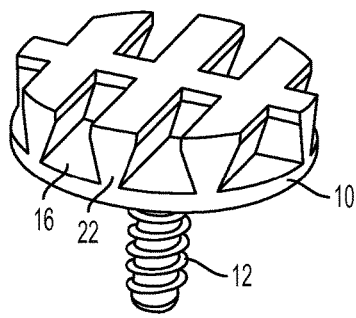
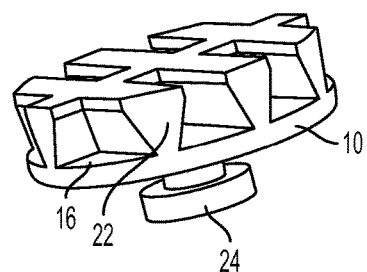
FIG. 3              FIG. 4

PLASTIC COMPONENT AND METHOD FOR PRODUCING A PLASTIC COMPONENT

RELATED APPLICATIONS

The present application is a national phase entry of International Application No. PCT/US2013/033075 filed Mar. 20, 2013, which claims priority of German Application No. 10 2012 005 739.3 filed Mar. 23, 2012.

The invention relates to a plastic component with at least one fastening element attached to the plastic component, wherein the fastening element comprises at least one attachment section for attachment to the plastic component and at least one fastening section for fastening a part to be mounted on the plastic component. The invention also relates to a method for producing a plastic component with at least one fastening element attached to the plastic component.

Fiber-reinforced plastic is used increasingly in automobile construction for reasons of weight and stability under load. This also applies in particular to bodywork parts. Further parts, for example trim parts, frequently have to be fastened to such bodywork parts. Several fastening elements are mounted on the respective bodywork part, as a rule, for this purpose. The fastening elements comprise in each case fastening sections, for example latching elements or threaded bolts. The parts to be fastened to the bodywork part comprise corresponding fastening sections, by means of which they are fastened to the fastening sections of the fastening elements and consequently to the bodywork part.

The methods used in the case of conventional metal bodywork parts for mounting the fastening elements cannot be used easily with plastic bodywork parts. Bonding fastening elements to plastic components is known. However, high levels of cleanliness of the associated bonding faces are necessary for a proper adhesive connection. This frequently calls for expensive cleaning of the bonding faces. This increases the amount of money and time spent on assembly in a considerable manner. From EP 1 380 404 A1 or EP 1 197 316 A1 it is known to provide a metal insert part in sections with a coupling layer from a fiber-reinforced plastic material. The metal insert part is then integrated in a plastic part also from fiber-reinforced plastic by way of its section provided with the coupling layer. The coupling layer serves as a gradient layer which is to ensure good attachment of the metal insert part to the plastic material with a low amount of stress in the finished part. However, the applying of the coupling layer provides an additional operating step which increases the expenditure on production.

Proceeding from the prior art explained, the object underlying the invention is to provide a plastic component and a method of the aforementioned type by way of which a reliable attachment of a fastening element to the plastic component can be achieved at all times using a simple production technique.

The invention achieves the object on the one hand by means of a plastic component with at least one fastening element attached to the plastic component, wherein the fastening element comprises at least one attachment section for attachment to the plastic component and at least one fastening section for fastening a part to be mounted on the plastic component, wherein the plastic component is composed of a plastic matrix, wherein the attachment section of the fastening element is integrated in a first area of the plastic matrix, and wherein reinforcement fibres are integrated in a second, different area of the plastic matrix.

The invention also achieves the object by means of a method for producing a plastic component with at least one fastening element attached to the plastic component, in particular a plastic component as claimed in the invention, comprising the steps: at least one fastening element is inserted into a first area of a forming cavity of a casting mold with an attachment section, wherein a fastening section of the fastening element is separated from the forming cavity, reinforcement fibres are inserted into a second, different area of the forming cavity of the casting mold, a plastic matrix is introduced into the forming cavity in a flowable state, wherein the attachment section of the fastening element is integrated in a first area of the plastic matrix, and wherein the reinforcement fibres are integrated in a second, different area of the plastic matrix, the plastic matrix is hardened and the plastic component is demolded from the casting mold together with the fastening element.

The plastic component can be a component of an automobile, for example a bodywork component. At least one other part, for example a plastic or metal part, can be fastened to the plastic component in a manner known per se. For example, this can be a trim part. As a rule, several fastening elements are mounted on the plastic component for fastening the component. The part is then fastened in the aforementioned manner to the fastening sections of the fastening elements and consequently to the plastic component. The fastening sections of the fastening elements can comprise in each case, for example, a latching element or a threaded element for this purpose. For example, the latching element can be a latching ball or a latching element which is T-shaped in cross section. Threaded bolts can be used as the threaded element.

The plastic component as claimed in the invention is a fiber-reinforced plastic component. It is composed of a plastic matrix with a first and second area, wherein reinforcement fibers are integrated in the second area. As a rule, the second area is considerably larger than the first area and essentially forms the plastic component, for example a bodywork part of an automobile. In principle, all reinforcement fibers can be used. Carbon fibers are named as an example such that the plastic component is a CFRP component or glass fibers such that the plastic component is a GFRP component. In principle, all plastic matrix materials can also be used as the plastic matrix. For example, the plastic matrix can be formed by a resin, for example a polyester resin or epoxy resin.

The plastic matrix is introduced, in particular, in a casting process, the reinforcement fibers being placed in a manner known per se into an area of a casting mold forming the second area of the plastic matrix, for example as woven fabric, non-woven fabric, fleece, matting etc. The plastic matrix is then introduced into the casting mold in a flowable state, wherein the reinforcement fibres are saturated in a manner known per se by the flowable plastic matrix and are thus integrated in the second area of the plastic matrix. These types of casting methods are known, for example, as Resin Transfer Molding (RTM) or as the Sheet Transfer Molding Compound method (SMC). At the same time, the attachment section of the fastening element or the attachment sections of the fastening elements is or are flowed around by the poured-in plastic matrix and thus (in each case) are integrated (only) in a first area of the plastic matrix. In a corresponding manner, said first area does not comprise any reinforcement fibers. Insofar as several fastening elements are attached to the plastic component in said manner, several first areas of the plastic matrix are correspondingly formed without reinforcement fibers, into each of which areas one attachment section of a fastening element is then integrated.

The attachment section of the fastening element as claimed in the invention can be realized, for example, in the shape of a disk.

As claimed in the invention, production of a fiber-reinforced plastic component with simultaneous integration of at least one fastening element in the plastic matrix of the plastic component is therefore effected in a simple manner. Expensive preliminary treatments, such as, for example, cleaning of bonding faces or applying a coupling layer onto the attachment section of the fastening section of the fastening element beforehand in a costly manner are not necessary. The production process is therefore considerably simplified. At the same time, a particularly secure connection between the plastic component and the fastening element, which also withstands high loads in operation, is obtained by means of, in particular, a positively bonded and/or positively locked attachment of the fastening element to the plastic component. The fastening element as claimed in the invention can consist of a plastic material. Precisely such a plastic fastening element is able to be integrated in the manner as claimed in the invention in the plastic matrix of a plastic component in a more reliable manner and in a manner which is highly loadable in operation without, for example, coupling layers being necessary as gradient layers. A fastening element of a plastic material is able to be realized in particular in one piece and can be produced, for example, using a plastic material injection molding method. In principle, it is possible for the plastic fastening element to be fiber-reinforced, in particular short-fiber-reinforced. As an alternative to this, it is also possible for the fastening element to consist of a metal material. Insofar as is necessary, the fastening element can then be provided with an anti-corrosive coating.

As claimed in one development, the attachment section of the fastening element can comprise at least one form element projecting from a surface of the attachment section, wherein the at least one form element is integrated in the first area of the plastic matrix. This means that the attachment of the fastening element to the plastic component is improved. The at least one form element can bring about a frictional connection between the fastening element and the plastic matrix. The at least one form element can comprise a disk which is arranged at a distance parallel to the surface of the attachment section and is connected to the surface of the attachment section by means of at least one connecting section. The disk then forms an undercut which is engaged behind by the plastic matrix. This means that the attachment is improved further. The disk can be connected to the attachment section, for example by means of a central column-like connecting section. To improve the attachment further, the disk can be provided with holes and the first area of the plastic matrix can extend through the holes. In the case of said development, the plastic matrix flows through the holes during casting and in the hardened state results in the fastening element being interlocked with the plastic component, in particular friction-locked.

The attachment section of the fastening element can also comprise several form elements projecting from a surface of the attachment section, wherein the form elements are integrated in the first area of the plastic matrix. The provision of several form elements improves the attachment. Once again, the form elements can bring about friction-locking between the fastening element and the plastic matrix. At least some of the form elements can extend crosswise over the surface of the attachment section. The form elements extend therefore over the surface of the attachment section in at least two directions which are at an angle with respect to one another, for example a right angle.

The form elements can comprise webs, for example, which extend substantially perpendicular with respect to the surface of the attachment section. Once again, at least one of the form elements, in particular all of the form elements, can be provided with holes, wherein the first area of the plastic matrix extends through the holes. The plastic matrix then once again flows through the holes during casting and in this way, in the hardened state, results in the fastening element being interlocked with the plastic component, in particular friction-locked.

The form elements can have a T-profile in cross section. The web of the respective T-profile can be connected by way of its one end to the surface of the attachment section and can extend, for example, perpendicularly with respect to the surface. The flange of the T-profile can be provided at its other end. Said flange then once again forms an undercut which is flowed around by the plastic matrix in the course of the casting process and in this way is engaged behind in the hardened state. This means that particularly secure interlocking between the plastic component and the fastening element is obtained. The form elements can also have an I-profile in cross section. It can also be provided that the form elements have a triangular profile in cross section. The tip of the triangle can then be connected to the surface of the attachment section in the cross sectional view. The form elements, which are triangular in cross section, define between them funnel-shaped recesses, the necks of which face away from the surface of the attachment section. This also means that more secure interlocking between the plastic component and the fastening element is obtained.

As claimed in another development, the attachment section of the fastening element can comprise at least one sealing element. The sealing element is realized for the purpose of sealing the fastening section with regard to the forming cavity when inserted in the forming cavity of a casting mold, so that the plastic material introduced into the forming cavity in the flowable state is not able to flow to the fastening section and lock a thread or similar, for example. The device as claimed in the invention can comprise a casting mold suitable for this purpose. In particular, when inserted into the casting mold, the sealing element is able to achieve positive locking with the casting mold which ensures the sealing process. The attachment section, as already mentioned, can be disk-shaped. The sealing element can then extend over the circumference of the disk-shaped attachment section. This means that total sealing is achieved.

The sealing element can comprise at least one sealing edge. A double sealing edge, which consequently forms a sealing groove, can be provided in particular as the sealing edge. The sealing element can also comprise at least one sealing bead. Such a sealing edge or sealing groove or such a sealing bead, when the fastening element is inserted in the forming cavity of the casting mold, is able to achieve a locking connection in a particularly simple manner, which then takes care of the sealing process. The casting mold then has a form corresponding to the respective sealing element.

As claimed in a further development, the sealing element can comprise at least one elastic sealing lip. The elasticity brings about better adaptation to the walls of the casting mold defining the forming cavity and consequently achieves improved sealing. As already mentioned, the fastening element can be realized in principle in one piece, produced for example using a plastic material injection molding method. It is possible for the elastic sealing lip then to consist of a different material to the remaining part of the fastening element, for example a rubber material or an elastic plastic material, in particular a more elastic plastic material than the remaining part of the fastening element. The elastic sealing lip can then have been attached to the fastening element, for example, using a two-component injection molding method.

As claimed in another development, starting from the attachment section, the sealing lip can extend hood-like, in particular on the side of the, for example, disk-shaped attachment section which faces away from the fastening section. As claimed in a further development, the sealing lip can be formed in the shape of a bellows. It can then be formed additionally for the purpose of folding up further in the manner of a bellows when a force occurs in a direction perpendicular to the surface of the disk-shaped attachment section. This means that a particularly secure sealing action is obtained. The folding up of the sealing lip is effected in particular in the course of the insertion of the fastening element into the forming cavity of the casting mold. A sufficient force for folding up the sealing lip is exerted by the walls of the casting mold.

The plastic component as claimed in the invention can have been produced using the method as claimed in the invention. In a corresponding manner, the method as claimed in the invention can be carried out with a fastening element as claimed in the invention.

Figure 6:
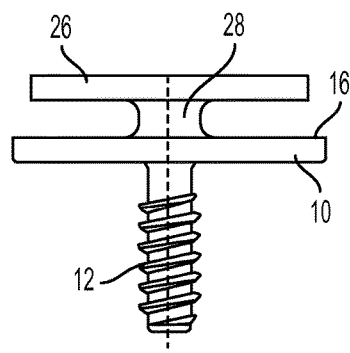
Figure 7:
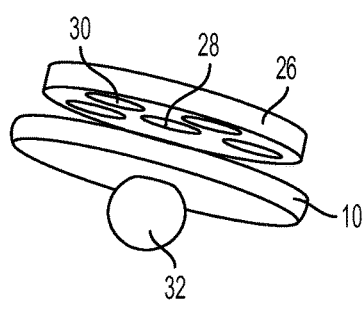
Figure 8:
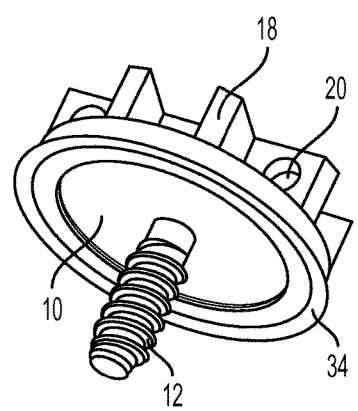
Figure 9:
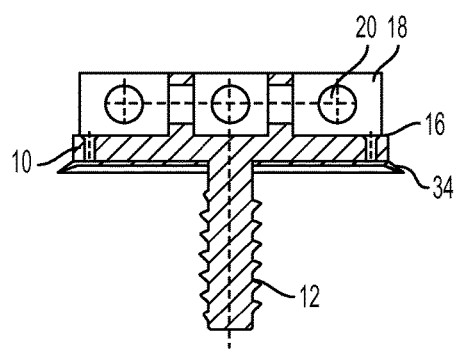
Figure 10:
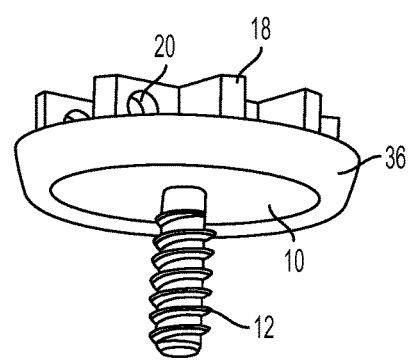
Figure 11:
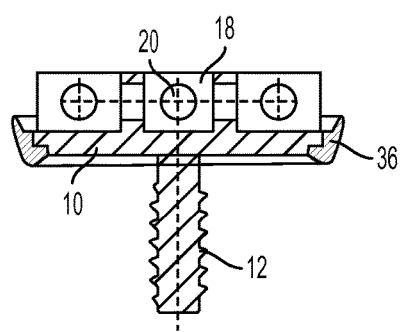
Figure 12:
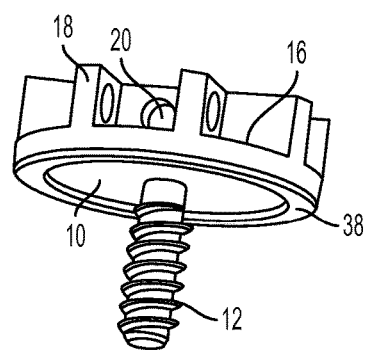
Figure 13:
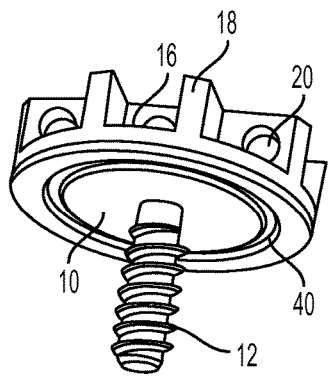
Figure 14:
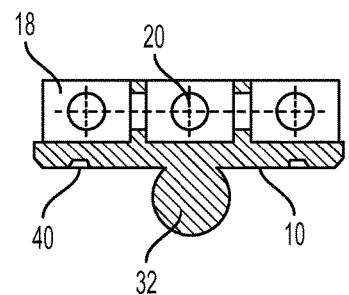
Figure 15:
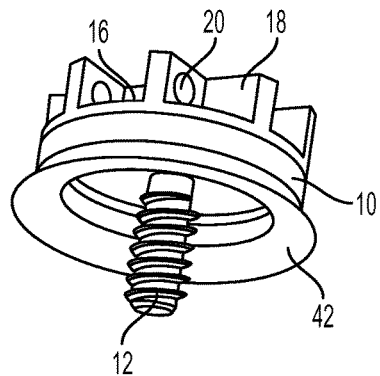
Figure 16:
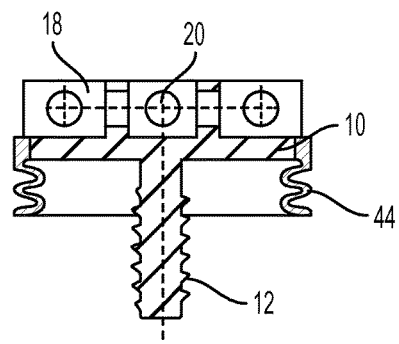
Figure 17:
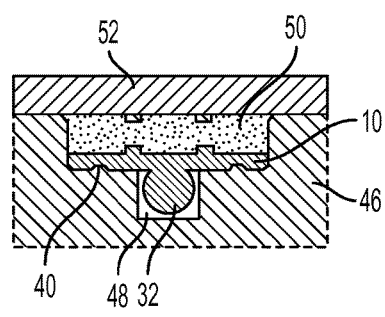
Figure 18:
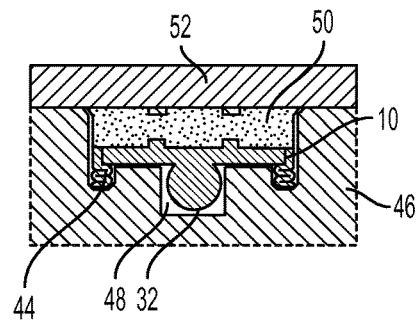
Figure 19:
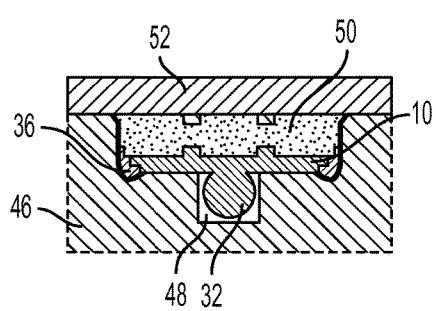
Figure 20:
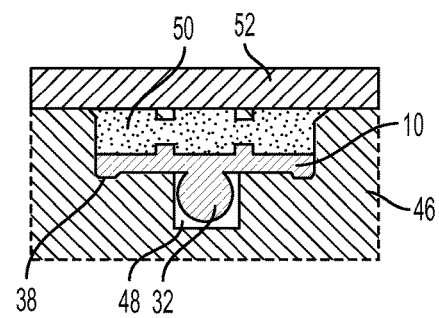

Exemplary embodiments of the invention are explained in more detail below by way of figures, in which:

FIG. 1 shows a perspective view of a schematic representation of a fastening element of a plastic component as claimed in the invention according to a first exemplary embodiment, FIG. 2 shows a perspective view of a schematic representation of a fastening element of a plastic component as claimed in the invention according to a second exemplary embodiment, FIG. 3 shows a perspective view of a schematic representation of a fastening element of a plastic component as claimed in the invention according to a third exemplary embodiment, FIG. 4 shows a perspective view of a schematic representation of a fastening element of a plastic component as claimed in the invention according to a fourth exemplary embodiment, FIG. 5 shows a perspective view of a schematic representation of a fastening element of a plastic component as claimed in the invention according to a fifth exemplary embodiment, FIG. 6 shows a side view of a schematic representation of the fastening element from FIG. 5, FIG. 7 shows a perspective view of a schematic representation of a fastening element of a plastic component as claimed in the invention according to a sixth exemplary embodiment, FIG. 8 shows a perspective view of a schematic representation of a fastening element of a plastic component as claimed in the invention according to a seventh exemplary embodiment, FIG. 9 shows a sectional view of a schematic representation of the fastening element from FIG. 8, FIG. 10 shows a perspective view of a schematic representation of a fastening element of a plastic component as claimed in the invention according to an eighth exemplary embodiment, FIG. 11 shows a sectional view of a schematic representation of the fastening element from FIG. 10, FIG. 12 shows a perspective view of a schematic representation of a fastening element of a plastic component as claimed in the invention according to a ninth exemplary embodiment, FIG. 13 shows a perspective view of a schematic representation of a fastening element of a plastic component as claimed in the invention according to a tenth exemplary embodiment, FIG. 14 shows a schematic representation of a sectional view of a fastening element of a plastic component as claimed in the invention according to an eleventh exemplary embodiment, FIG. 15 shows a perspective view of a schematic representation of a fastening element of a plastic component as claimed in the invention according to a twelfth exemplary embodiment, FIG. 16 shows a sectional view of a schematic representation of a fastening element of a plastic component as claimed in the invention according to a thirteenth exemplary embodiment, FIG. 17 shows a sectional view of a schematic representation of a plastic component as claimed in the invention according to a first exemplary embodiment, FIG. 18 shows a sectional view of a schematic representation of a plastic component as claimed in the invention according to a second exemplary embodiment, FIG. 19 shows a sectional view of a schematic representation of a plastic component as claimed in the invention according to a third exemplary embodiment and FIG. 20 shows a sectional view of a schematic representation of a plastic component as claimed in the invention according to a fourth exemplary embodiment.

Insofar as nothing to the contrary is specified, identical references in the figures designate identical objects. FIG. 1 shows a fastening element of a plastic component as claimed in the invention. In the example shown, the fastening element has a disk-shaped attachment section 10 for attachment to the plastic component and a fastening section, in the present case a threaded bolt 12, which extends centrally from a surface of the attachment section 10, in FIG. 1 the underside of the attachment section 10. In the example shown in FIG. 1, several form elements 14 project from the surface 16 of the attachment section 10 which faces away from the threaded bolt 12, in FIG. 1 the top side of the attachment section 10. The form elements 14 in FIG. 1 each have a T-shaped cross section, the webs of the form elements 14 with the T-shaped cross section extending perpendicularly from the surface 16 of the attachment section 10 such that the flange of the respective T-profile is provided on the end of the respective web 14 which faces away from the surface 16. In the example shown, three form elements 14 which extend parallel with respect to one another and one form element 14 which extends at a right angle crosswise with respect to said form elements 14 are provided.

FIG. 2 shows another exemplary embodiment of a fastening element as claimed in the invention which corresponds extensively to the exemplary embodiment in FIG. 1. Contrary to FIG. 1, however, the fastening element from FIG. 2 has several form elements 18 which have an I-profile in cross section. The form elements 18 are realized in each case in the manner of a web, a total of four form elements 18 being provided, two of which in each case extend parallel with respect to one another, the one pair of parallel extending form elements 18 extending crosswise perpendicularly to the other pair of parallel extending form elements 18. In the case of the exemplary embodiment according to FIG. 2, holes 20 are realized over and above this in at least some of the form elements 18.

FIG. 3 shows another exemplary embodiment of a fastening element as claimed in the invention which, once again, is extensively similar to the exemplary embodiment according to FIG. 1. Contrary to FIG. 1, however, the form elements 22 in the case of the exemplary embodiment according to FIG. 3 are triangular in cross section, the tip of the triangle in cross section being connected to the surface 16 of the attachment section 10. The form elements 22, which are triangular in cross section, form between them funnel-shaped recesses. The exemplary embodiment according to FIG. 4 is extensively similar to the exemplary embodiment according to FIG. 3, unlike FIG. 3, in the case of the exemplary embodiment according to FIG. 4 a latching element 24 with a T-shaped cross section being provided as the fastening section in place of the threaded bolt 12.

FIGS. 5 and 6 show a further exemplary embodiment of a fastening element as claimed in the invention. Once again this latter corresponds extensively to the exemplary embodiment according to FIG. 1. Unlike FIG. 1, however, the fastening element from FIGS. 5 and 6 comprises only one form element 26 in the form of a disk 26 which is arranged parallel to the surface 16 of the attachment section 10 and at a distance therefrom. The disk 26 is connected to the disk-shaped attachment section 10 by means of a central column-like connecting section 28. As can be seen in particular in FIG. 5, several holes 30 are realized in the disk 26. In the case of the exemplary embodiment according to FIG. 7, a latching ball 32 is provided as the fastening section in place of the threaded bolt 12 in FIGS. 5 and 6. For the rest, the exemplary embodiment according to FIG. 7 is similar to the exemplary embodiment according to FIGS. 5 and 6.

The fastening elements shown in FIGS. 1 to 7 can consist, for example, in one piece of a plastic material, produced, for example, using a plastic material injection molding method. The fastening elements shown can comprise in each case a threaded bolt 12, a latching section 24 which is T-shaped in cross section or a latching ball 32 as the fastening section. They can also have other fastening sections. A part to be fastened to the plastic component is mounted on said fastening sections in operation in a manner known per se. It must also be pointed out that the holes 20 or 30, shown as an example in the case of the fastening elements from FIGS. 2 and 5 to 7, can obviously also be provided in the case of the form elements 14 or 22 of the fastening elements shown in FIGS. 1, 3 and 4.

Different developments of sealing elements of the fastening elements are now to be explained by way of FIGS. 8 to 16. The sealing elements are explained as an example by way of a fastening element, as is shown in FIG. 2. However, they can also be provided in the same way in the case of the fastening elements shown in FIGS. 1 and 3 to 7 and can be combined in an arbitrary manner with the fastening elements.

In the case of the exemplary embodiment according to FIGS. 8 and 9, a sealing lip 34 extends hood-like on the underside and over the circumference of the disk-shaped attachment section 10 away from the underside of the disk-shaped attachment section 20. The sealing lip 34 can be elastic and can have been sprayed onto the fastening element, for example using a two-component injection molding method. An alternative development of a sealing lip which extends over the circumference of the disk-shaped attachment section 10 is shown in FIGS. 10 and 11 with the reference 36. Starting from the bottom edge of the disk-shaped attachment section 10, said sealing lip 36 extends in a bowl-like manner in the direction of the form elements 18. The sealing lip 36 can also be elastic and, for example, can have been sprayed onto the fastening element using a two-component injection molding method.

FIGS. 12 to 14 show developments where a sealing element is realized integrally on the fastening element and is in particular from the same material as the fastening element. Correspondingly, the fastening elements according to FIGS. 12 to 14 can be produced in one piece with their respective sealing element using a plastic material injection molding method. In the case of the exemplary embodiment according to FIG. 12, the disk-shaped attachment section 10 comprises, on its underside which faces away from the form elements 18, a ring-shaped circumferential sealing bead 38. In the case of the exemplary embodiments according to FIGS. 13 and 14, contrary to this, a double sealing edge is provided which also runs around in a ring-shaped manner on the underside of the disk-shaped attachment section 10 which faces away from the form elements 18. It forms a sealing groove 40. It must be pointed out that the exemplary embodiments according to FIGS. 13 and 14 are completely the same as one another apart from the fact that the fastening element according to FIG. 13 comprises a threaded bolt 12 as the fastening section and the fastening element according to FIG. 14 comprises a latching ball 32 as the fastening section.

In the case of the exemplary embodiment according to FIG. 15, on the underside of the disk-shaped attachment section 10 which faces away from the form elements 18 there is once again a ring-shaped circumferential elastic sealing lip 42 which extends downward in a hood-like manner in the exemplary embodiment shown in FIG. 15. In the case of the exemplary embodiment according to FIG. 16, a sealing lip 44, which extends downward over the circumference of the disk-shaped attachment section 10, that is away from the form elements 18, is provided, said sealing lip being realized in the manner of a bellows. The sealing lips 42, 44 shown in FIGS. 15 and 16, once again, can be elastic and, for example, can have been sprayed onto the respective fastening element using a two-component injection molding method.

The production as claimed in the invention of a plastic component as claimed in the invention with a fastening element integrated therein is now to be explained by way of FIGS. 17 to 20. The plastic component and a tool for the production, in particular a casting mold, are only shown in part in this case. In FIG. 17, the fastening element shown in FIG. 14 is integrated in a plastic component as an example. To this end, the fastening element is inserted into the forming cavity of a casting mold shown with the reference 46. In particular, the fastening element with its attachment section 10 and its form elements 18 is inserted into a first area of the molding cavity of the casting mold. The fastening section, in particular the latching ball 32, is separated from the forming cavity when the fastening element is inserted. In particular, the latching ball 32 is situated in a cavity 48 which is separated from the forming cavity of the casting mold 46. Reinforcement fibers are introduced into a second area of the forming cavity of the casting mold 46. The forming cavity is then filled with a flowable plastic matrix, a first area 50 of the plastic matrix and a second area 52 of the plastic matrix being formed. The fastening element is integrated with its attachment section 10, in particular with its form elements 18, into the first area 50 of the plastic matrix. The reinforcement fibers, on the other hand, are integrated into the second area 52 of the plastic matrix. No reinforcement fibers are provided in the first area 50 of the plastic matrix. Once the plastic matrix has hardened, the plastic component, formed in particular by the second area 52 of the plastic matrix, together with the fastening element, which is connected to the plastic matrix by means of the first area 50 of the plastic matrix, are able to be removed from the casting mold 46.

The sealing element, in FIG. 17 in the form of the sealing groove 40, together with a corresponding sealing projection of the casting mold 46, prevents the plastic matrix flowing into the cavity 48 of the casting mold 46 and consequently to the latching ball 32 during casting. Over and above this, the plastic matrix also flows in the first area 50 right through the holes 20 of the form elements 8 and hardens therein. This causes the fastening element to interlock with the plastic component.

In the example shown in FIG. 18, a fastening element as is shown in principle in FIG. 16 has been used, the fastening element in FIG. 18 comprising a latching ball 32 as the fastening section in place of the threaded bolt 12. It can be seen in FIG. 18 that when inserted in the casting mold 46 the bellows-like sealing lip 44 is folded up further. This means that the achieved sealing of the cavity 48 and consequently of the latching ball 32 in relation to the forming cavity of the casting mold 46 is improved even further. For the rest, the production of the plastic component in the case of the exemplary embodiment according to FIG. 18 is similar to the exemplary embodiment according to FIG. 17.

FIG. 19 shows a further exemplary embodiment where the fastening element shown in FIGS. 10 and 11 is used, this one, however, comprising a latching ball 32 in place of the threaded bolt 12. Once again, it can be seen that when inserted into the casting mold 26, the sealing lip 36 is somewhat deformed and even better sealing is achieved in this way. For the rest, the exemplary embodiment according to FIG. 19 is similar to the exemplary embodiments shown in FIGS. 17 and 18.

Finally, FIG. 20 shows an exemplary embodiment where a fastening element as is shown in principle in FIG. 12 is used, once again a latching ball 32 being provided in place of the threaded bolt 12 shown in FIG. 12. The sealing is achieved in this case by means of the sealing bead 38 and a corresponding sealing groove in the casting mold 46. For the rest, said exemplary embodiment once again corresponds to the exemplary embodiment from FIG. 17.

It must be pointed out that the fastening elements shown in FIGS. 17 to 20 are illustrated purely as examples. In the same way, the remaining fastening elements as claimed in the invention and shown in the figures are able to be integrated in the plastic component in the manner explained.

The invention claimed is:

1. An assembly, comprising:
a plastic component with at least one fastening element attached to the plastic component, wherein the fastening element comprises at least one attachment section for attachment to the plastic component and at least one fastening section for fastening a part to be mounted on the plastic component, wherein the plastic component is composed of a plastic matrix, wherein the attachment section of the fastening element is integrated in a first area of the plastic matrix, and wherein reinforcement fibres are integrated in a second, different area of the plastic matrix, wherein the attachment section of the fastening element comprises at least one form element projecting from a surface of the attachment section, wherein the at least one form element is integrated in the first area of the plastic matrix, wherein the form element comprises a lattice structure.

2. The assembly as claimed in claim 1, wherein the fastening element consists of a plastic material.

3. The plastic component as claimed in claim 1, wherein the attachment section of the fastening element comprises at least one sealing element.

4. The assembly as claimed in claim 1, wherein the attachment section is a circular disk.

5. The assembly as claimed in claim 1, wherein the attachment section is part of a monolithic component.

6. A method for producing an assembly comprising a plastic component with at least one fastening element attached to the plastic component, in particular a plastic component as claimed in claim 1, comprising the steps:
a. at least one fastening element is inserted into a first area of a forming cavity of a casting mold with an attachment section, wherein a fastening section of the fastening element is separated from the forming cavity,
b. reinforcement fibres are inserted into a second, different area of the forming cavity of the casting mold,
c. a plastic matrix is introduced into the forming cavity in a flowable state, wherein the attachment section of the fastening element is integrated in a first area of the plastic matrix, and wherein the reinforcement fibres are integrated in a second, different area of the plastic matrix,
d. the plastic matrix is hardened and the plastic component is demolded from the casting mold together with the fastening element.

7. The method as claimed in claim 6, wherein the attachment section of the fastening element comprises at least one sealing element, wherein the sealing element seals the fastening section with regard to the forming cavity when inserted in the forming cavity of the casting mold.

8. An assembly, comprising:
a plastic component with at least one fastening element attached to the plastic component, wherein the fastening element comprises at least one attachment section for attachment to the plastic component and at least one fastening section for fastening a part to be mounted on the plastic component, wherein the plastic component is composed of a plastic matrix, wherein the attachment section of the fastening element is integrated in a first area of the plastic matrix, and wherein reinforcement fibres are integrated in a second, different area of the plastic matrix, wherein the attachment section of the fastening element comprises at least one form element projecting from a surface of the attachment section, wherein the at least one form element is integrated in the first area of the plastic matrix, wherein the form element includes a crisscross structure.

* * * * *